(12) United States Patent
Anikitchev (10) Patent No.: US 7,265,908 B2
(45) Date of Patent: Sep. 4, 2007

(54) APPARATUS FOR PROJECTING A LINE OF LIGHT FROM A DIODE-LASER ARRAY

(75) Inventor: Serguei G. Anikitchev, Belmont, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 11/312,004

(22) Filed: Dec. 19, 2005

(65) Prior Publication Data
US 2007/0139926 A1 Jun. 21, 2007

(51) Int. Cl.
G02B 27/10 (2006.01)
B23K 26/06 (2006.01)

(52) U.S. Cl. .................... 359/619; 219/121.75

(58) Field of Classification Search ........... 359/619, 359/621, 622, 623, 626; 353/67; 219/121.75
See application file for complete search history.

(56) References Cited

U.S. PATENT DOCUMENTS

| | | | |
|---|---|---|---|
| 4,497,015 A | 1/1985 | Konno et al. ............. 362/268 |
| 4,619,508 A | 10/1986 | Shibuya et al. ........... 353/122 |
| 4,826,269 A | 5/1989 | Streifer et al. ........... 350/3.72 |
| 5,091,636 A | 2/1992 | Takada et al. ............ 235/454 |
| 5,504,317 A | 4/1996 | Takahashi .................. 235/462 |
| 5,517,359 A | 5/1996 | Gelbart ..................... 359/623 |
| 5,521,748 A | 5/1996 | Sarraf ....................... 359/321 |
| 5,594,526 A | 1/1997 | Mori et al. ................ 355/67 |
| 5,610,763 A | 3/1997 | Kudo ......................... 359/619 |
| 5,710,418 A | 1/1998 | Tawara ...................... 235/472 |
| 5,923,475 A | 7/1999 | Kurtz et al. ............... 359/619 |
| 5,967,645 A | 10/1999 | Anderson .................. 362/259 |
| 5,969,872 A | 10/1999 | Ben Oren et al. ......... 359/621 |
| 6,014,260 A | 1/2000 | Godard et al. ............ 359/619 |
| 6,064,528 A | 5/2000 | Simpson, Jr. ............. 359/619 |
| 6,356,380 B1 | 3/2002 | Whitney .................... 359/321 |
| 6,384,981 B1 | 5/2002 | Hauschild .................. 359/622 |
| 6,411,440 B2 | 6/2002 | Ohuchi et al. ............ 359/621 |
| 6,421,178 B1 | 7/2002 | Lissotschenko et al. ... 359/559 |
| 6,431,727 B1 | 8/2002 | Sugawara et al. ......... 362/244 |
| 6,433,934 B1 | 8/2002 | Reznichenko et al. ..... 359/622 |
| 6,478,452 B1 | 11/2002 | Richardson et al. ....... 632/268 |
| 6,494,371 B1 | 12/2002 | Rekow et al. ............. 235/454 |
| 6,499,845 B2 | 12/2002 | Sato ........................... 353/38 |

(Continued)

FOREIGN PATENT DOCUMENTS

| | | |
|---|---|---|
| EP | 0 886 162 A2 | 6/1998 |
| EP | 1 331 709 A1 | 7/2003 |
| JP | 2003090959 | 3/2003 |
| JP | 2003218017 | 7/2003 |

Primary Examiner—Alcia M Harrington
(74) Attorney, Agent, or Firm—Stallman & Pollock LLP (57) ABSTRACT

Optical apparatus for projecting a line of light includes a diode-laser bar having a plurality of individual emitters, input and output microlens arrays, a lens and other optical elements. The diode-laser bar, the microlens arrays, and the lens are configured and arranged such that the microlens arrays form three or more slow-axis intermediate near-field images of each emitter in a plane immediately adjacent the output microlens array, and in a telecentric arrangement with the lens. The lens and the optical elements project overlapping elongated far-field images of the intermediate near-field images to form the line of light.

29 Claims, 8 Drawing Sheets

U.S. PATENT DOCUMENTS

| | | |
|---|---|---|
| 6,505,957 B2 | 1/2003 | Chuang ........................ 362/268 |
| 6,773,142 B2 | 8/2004 | Rekow ......................... 362/259 |
| 2002/0024740 A1* | 2/2002 | Hashimoto .................. 359/619 |
| 2003/0234751 A1 | 12/2003 | Hwang ......................... 345/32 |
| 2004/0091013 A1 | 5/2004 | Yamaguchi et al. ......... 372/108 |
| 2005/0063428 A1 | 3/2005 | Anikitchev et al. ............. 372/9 |

* cited by examiner

APPARATUS FOR PROJECTING A LINE OF LIGHT FROM A DIODE-LASER ARRAY

TECHNICAL FIELD OF THE INVENTION

The present invention relates in general to diode-laser light-sources. It relates in general to a light source for projecting light from a linear diode-laser array into an elongated line of light.

DISCUSSION OF BACKGROUND ART

Diode-lasers are commonly used as sources of illumination in various graphics applications such as display systems, optical printing systems and optical recording systems. By way of example, in one type of prior-art imaging system, a linear (one-dimensional) array of light modulators is illuminated by an illuminator including a light source. Illumination from the array of modulators is projected onto a recording medium or the like in the form of a line of images of the modulators. By scanning the recording medium past the line of images and appropriately synchronizing the scanning with operation of the modulator array, the modulator array is used to draw a two-dimensional image on the recording medium.

A preferred light-source for the illuminator is a linear array of diode-lasers commonly referred to as a diode-laser bar. A diode-laser bar can efficiently provide relatively high illumination power, for example about 60 Watts (W) or more, from a source having a maximum overall dimension no greater than about 10 millimeters. A disadvantage, however, is that each of the diode-lasers in the bar is an individual emitter. This presents problems in selecting an appropriate optical configuration for the illuminator.

This problem is addressed in one prior-art illuminator by including a diode-laser array (or correspondingly an array of light-emitting diodes) having a number of emitters equal to the amount of modulators to be illuminated, and an optical system configured to image each emitter onto a corresponding modulator. This type of illuminator has a disadvantage in that it is dependent on all emitters continuing to function. Failure of one emitter could cause at least a reduction in performance of the recording system, for example, a black line on an image in the direction of scanning.

An illuminator apparatus for overcoming this disadvantage is disclosed in U.S. Pat. No. 6,433,934 (Reznichenko et al.). Here, an optical system is used to project elongated, overlapping images of each individual emitter onto a modulator array. Each emitter in a high power diode-laser bar has an emitting aperture having a height of about 1 micrometer (μm) in a so called fast-axis of the bar (perpendicular to the length of the bar) and a width between about 50 and 150 in a so called slow-axis parallel to the length of the bar. The images have a length (the length of the projected line) in the slow axis and a height in the fast axis. In this kind of system, the number of emitters need not correspond to the number of modulators, and failure of an individual emitter is described as merely reducing the overall illumination on the modulator rather than effecting the spatial distribution of illumination on the modulator.

Figures 1, 1A, 1B:
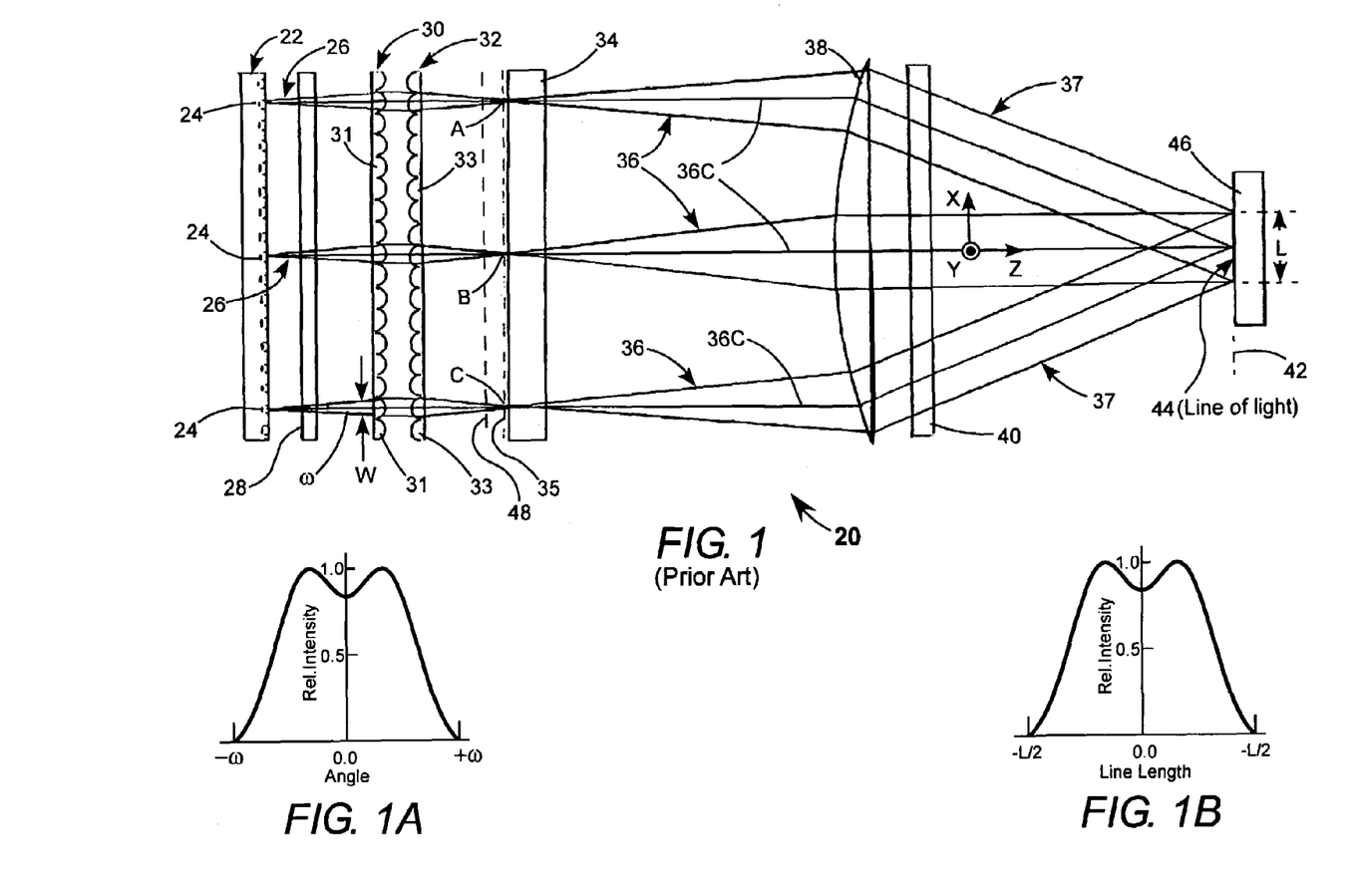
FIG. 1 is a slow-axis view schematically illustrating a prior-art optical system for projecting a line of light, wherein a diode-laser bar has a plurality of emitters, wherein two cylindrical microlens arrays, each having the same number of microlenses as there are emitters, form intermediate images of the emitters in a telecentric arrangement with a spherical lens which forms overlapping far-field images of each of the emitters in a focal plane of the lens to form the line of light.
FIG. 1A is a graph schematically illustrating a hypothetical distribution of relative light-intensity as a function of divergence angle for light from an emitter on entering the microlens arrays of the system of FIG. 1.
FIG. 1B is a graph schematically illustrating an estimated distribution of relative light intensity as a function of length along the line of light for one of the elongated images of an intermediate image of the diode-laser bar formed by the microlens arrays of the system of FIG. 1.

FIG. 1 is a slow-axis view of the system 20 of Reznichenko et al. This drawing is reproduced in part from the '934 patent, with some added notation, and with some different reference numerals. A diode-laser bar 22 has a plurality (here seventeen) of emitters 24. Each emitter 24 emits a beam 26 having a slow-axis divergence half-angle ω. Beams 26 are collimated in the fast-axis (not shown) by a cylindrical lens 28 that has no effect on the slow-axis divergence of the beams. Two spaced apart arrays 30 and 32 of cylindrical microlenses 31 and 32 respectively are located in the path of beams 26. Each cylindrical microlens has optical power (here positive) in the slow-axis only. In FIG. 1, and in other drawings discussed hereinbelow, the slow-axis, the fast-axis, and the propagation direction (propagation-axis) are designated as respectively the X-axis, Y-axis, and Z-axis of a Cartesian axis system.

In each microlens array there are as many microlenses as there emitters in the diode-laser bar. Each microlens in each array is aligned with a corresponding emitter. The axial spacing of the lenses and the physical aperture of the lenses in the slow axis is selected such that the entire width W of a beam 26 entering a microlens 31 of array 30 can enter the microlens. Microlenses 31 collimate the beams 26 in the slow axis, and corresponding microlenses 33 of array 32 form intermediate near-field images of the emitting apertures in a plane 35. Three of such images are designated A, B, and C in FIG. 1. Because of this arrangement, the chief rays 36C of converging bundles of rays forming the images and, correspondingly, of diverging bundles 36 of rays leaving the images are parallel to each other.

Bundles 36 pass through a cylindrical lens 34 having optical power in the fast axis only and are received by a spherical lens 38 having equal (positive) optical power in both fast and slow-axes. A front focal plane of lens 38 is arranged to be coplanar with plane 35 in which the intermediate images A, B, and C are formed. This, combined with the chief rays of bundles 36 being parallel to each other, places the images in a telecentric arrangement with lens 38. A result of this is that each slow-axis diverging ray-bundle 36 is converted into a corresponding parallel (collimated) ray-bundle 37. Ray-bundles 37 traverse a cylindrical lens 40, having optical power in the fast-axis only, and intersect in a rear (back) focal plane 42 of lens 38 to form (together with fast-axis focusing provided by lenses 34, 38, and 40) overlapping, elongated, images of the intermediate images of emitters 24 in plane 35. These overlapping images of intermediate images form a line of light 44 on a substrate 46, which among other objects or devices, can include a light modulator. It should be noted that in this system, and in similar systems discussed herein, that while fast-axis cylindrical lenses between the microlens array and the substrate do not affect beam divergence in the slow axis, the optical thickness of these lenses must be taken into effect in determining the physical location of focal planes of the spherical lens.

While the system of Reznichenko et al. serves the purpose of minimizing the above-discussed problem of emitter failure, the system has some potential shortcomings as far as uniformity and consistency of illumination along the projected line of light are concerned. This can be appreciated by considering the usual form of the distribution of light from a broad-stripe (much wider than it is high) individual; emitter and how that form is projected into the line of light.

FIG. 1A schematically illustrates an approximate hypothetical form of intensity of light in the far field of such an emitter as a function of divergence angle in a plane W just before a beam from the emitter enters microlens array 30 of the system of FIG. 1. The curve of the graph of FIG. 1 is actually a graph of a mathematical function that is a summation of two Gaussian curves displaced on negative and positive side of zero. This function is used in analyses throughout this application as the function provides for a convenient and sufficiently accurate analysis of the effects of optical systems and components on such a distribution. In this description, as is usual in the art, the term near-field is mean to designate a region within about one Rayleigh range of a beam from the emitter. The far-field is an extended region outside of the near-field region.

It should be recognized that, in practice, such a far-field distribution may not have this precise double Gaussian form, may be somewhat less symmetrical, may vary from one emitter to another, and will vary somewhat with variations in current applied to the emitter to energize the emitter. Variations in emitter-current are usually made to vary the power of light from an emitter. In this latter regard, the divergence half angle (designated angle ω in FIG. 1) can increase by up to 1° with an increase in current of about 100%. By way of example, in one prior-art line of light projector manufactured by Coherent, Inc., of Santa Clara Calif. (the assignee of the present invention) a change of emitter current from about 40 amperes (A) to about 90 A causes the slow-axis divergence half-angle (measured at the $1/e^2$ points of the beam) to increase from about 3.2° to about 4.5°.

In the system of FIG. 1, all of the beam from an emitter, and, accordingly, all of the hypothetical distribution of FIG. 1A enters one corresponding microlens 31 of array 30 and a corresponding microlens array 33 of array 32. The light distribution in the intermediate image is transformed from angular space to physical space by spherical lens 30 and the distribution of light as a function of distance along line of light 44 will appear (for one emitter) similar to that depicted in FIG. 1B. This is essentially the form of the far-field distribution of light from an emitter. Because of slight differences in this distribution from emitter to emitter, the distribution in the line of the summation of the contribution of all emitters will have a slightly flatter top and will exhibit modulation on a spatial frequency depending on the number of emitters contributing, among other factors. Nevertheless, in this summation, light near the ends of the line of light will be provided by light from the edges of the beams emitted by the emitters, this will result in "softness" or poor definition of the ends of the line, and also relatively strong variations in illumination at the ends of the line. This is because it is in these edges that the variation of emitter current has the most effect, and because rays in these edges are most aberrated by the microlenses.

A variation on the system of Reznichenko et al. is disclosed in U.S. Patent Application Document No. 20050063428 (Anikitchev et al.). This variation can be explained with reference again to FIG. 1, even though the slow axis spherical lens and fast-axis focusing lenses in the system of Anikitchev et al. are differently designed. In the system of Anikitchev et al. general uniformity of illumination along the line is improved by locating the front focal plane of the slow-axis spherical lens coincident with a plane (designated in FIG. 1 by dashed line 48) slightly ahead of the plane in which near field images of the emitters are formed. While this variation was effective in improving uniformity of light in general, the system suffered the same shortcoming as the system of Reznichenko et al. regarding softness and temporal variation of illumination at the ends of the line of light.

A feature in common to the systems of Reznichenko et al. and Anikitchev et al. is that microlenses in the microlens arrays are the same in number and pitch (vertex-to-vertex spacing) as emitters in the diode-laser bar, and further, are arranged such that of the beam from any emitter is accommodated by one corresponding microlens in the arrays. In an optical system disclosed in U.S. Pat. No. 6,773,142 granted to Mathew N. Rekow, and assigned to the assignee of the present invention, an attempt is made to improve uniformity in a projected line of light by configuring microlens arrays such that a beam from an emitter is wide enough in the slow axis to illuminate more than one microlens in an array, and also that there are more microlenses in an array than there are emitters, in such a way that light from more than one emitter can enter any one microlens.

Figure 2:
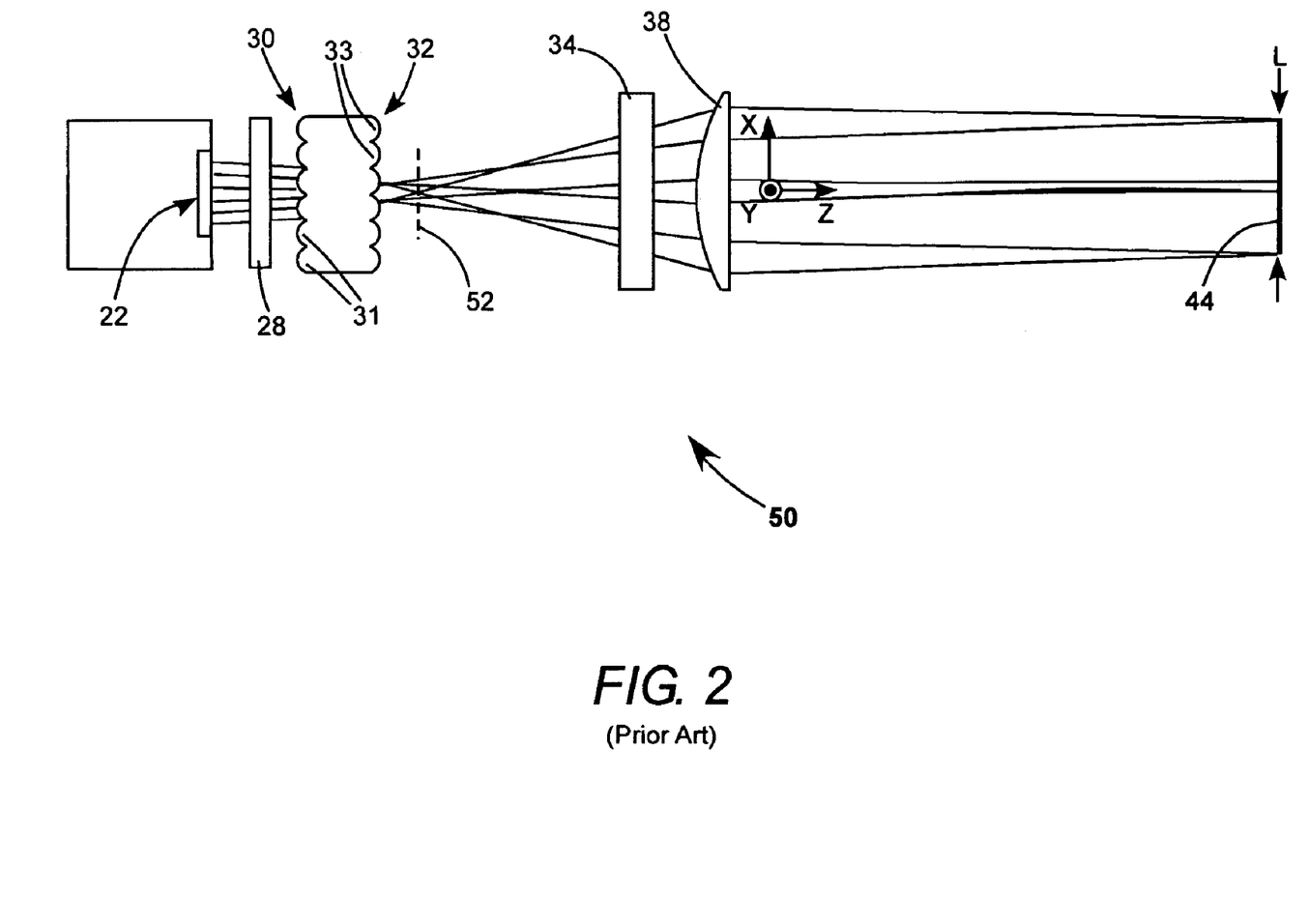
FIG. 2 is a slow-axis view schematically illustrating another prior-art optical system for projecting a line of light, similar to the system of FIG. 1, but wherein the microlens arrays each include more cylindrical lenses than there are emitters in the diode-laser bar and images formed by the microlens arrays are not in a telecentric arrangement with the spherical lens.

A slow-axis view 50 of the system of Rekow is depicted in FIG. 2. This drawing is reproduced in part from the '142 patent, with some simplification and some added notation, and with some different reference numerals. The reference numerals are selected such that like numerals designate like features of system of FIG. 2 and the Reznichenko system of FIG. 1. It should be noted that in FIG. 2 individual emitters of diode-laser bar 22 are not designated. Further, in FIG. 2 the separate cylindrical microlens arrays are consolidated into a single element with two arrays of convex cylindrical surfaces providing the two microlens arrays. The curvature and physical aperture of the microlenses lenses depicted in FIG. 2 are greatly exaggerated.

Rekow teaches that the action of the microlens arrays is to transform the array of spaced-apart emitter apertures in diode-laser bar 22 into a virtual, single emitting aperture at or near microlens array 32. Presumably, that is near a plane indicated in FIG. 2 by dotted line 52. Rekow teaches that because the pitch of the microlenses in the microlens arrays is different from the pitch of diode-lasers in the diode-laser bar, and that because each microlens receives rays from a different plurality of emitters, rays emanating from one position in an emitting aperture will arrive in different relative positions in this virtual aperture, and that this will randomize the distribution of light in the projected line.

It has been determined that the apparatus of Rekow does provide, a generally, relatively uniform distribution of light along the projected line, but that the projected line has a softness and inconsistency at the ends that would be experienced in the above-discussed Reznichenko et al. and Anikitchev et al. systems. It has also been determined that the system is very prone to light-losses and scatter by microlens arrays. In order to determine why this is the case, a more careful analysis of how the line is formed than the simplified description provided by Rekow has been performed. Results of this analysis are discussed below with reference to FIG. 3, FIG. 4, FIGS. 5A-C, and FIG. 6.

Figure 3:
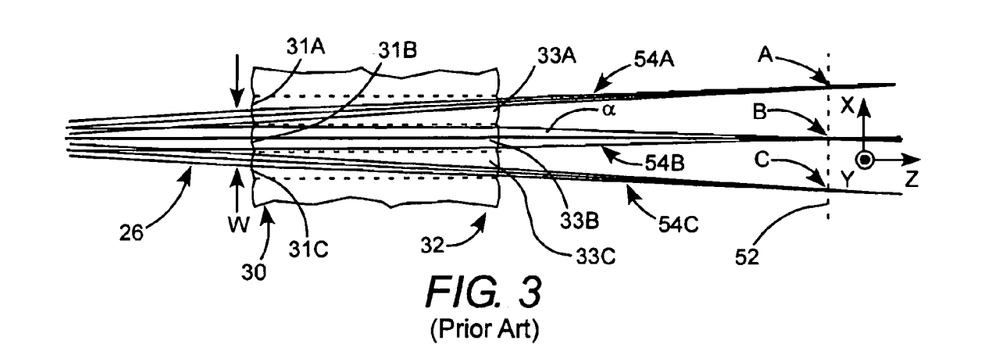
FIG. 3 is a slow-axis view schematically illustrating formation of three non-telecentrically arranged images as a result of a beam from an emitter intercepting three microlenses in the microlens arrays of the optical system of FIG. 2.

From exemplary values of spacing, microlens-pitch (vertex-to-vertex distance between adjacent cylindrical surfaces) and curvature provided by Rekow it can be determined that a beam from any one emitter has a width at the slow-axis about sufficient to cover two microlenses. FIG. 3 schematically illustrates a fragment of the microlens arrays illuminated symmetrically by a beam 26 from an emitter. This is reproduced from an actual ray trace using ZEMAX® optical design and analysis software, available from the ZEMAX Development Corporation of Bellevue, Wash. Here, the beam completely covers a central one 31B of three microlens arrays and partially covers one microlens array on either side of the central one (31A and 31C). The incoming beam is divided into 3 parts by microlenses 31A-C. Intermediate images A, B, and C are formed by microlens pairs 31A and 33A (image A), 31B and 33B (image B), and 31C and 33C (image C). It will be immediately evident from the drawing of FIG. 3 that some rays incident on all of microlenses 31A, 31B and 31C will not reach the corresponding lenses 33A, 33B, and 33C as required for image formation, but will emerge from the microlens array via an adjacent corresponding lens and can not contribute to image formation. This light is unlikely to reach the line of light. It will also be evident that bundles of rays 54A, 54B, and 54C that converge to form images A, B, and C, respectively, are not parallel to each other and, accordingly, are not in a telecentric arrangement with lens 38.

Figure 4:
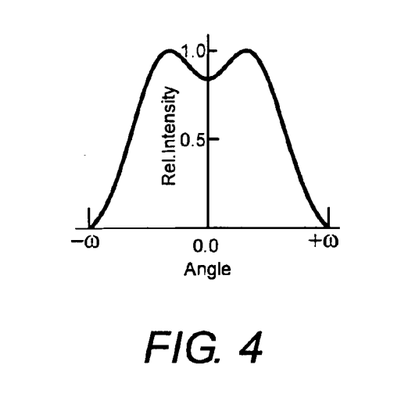
FIG. 4 is a graph schematically illustrating an estimated distribution of relative light intensity as a function of divergence angle for light from an emitter of the diode-laser bar on entering the microlens arrays of FIG. 3.
Figure 5:
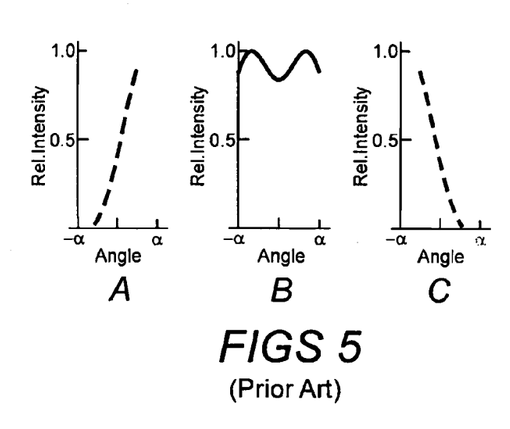
FIGS. 5A-C are graphs schematically illustrating a hypothetical distribution of relative light intensity as a function of divergence angle in ray bundles forming the images of FIG. 3.
Figure 6:
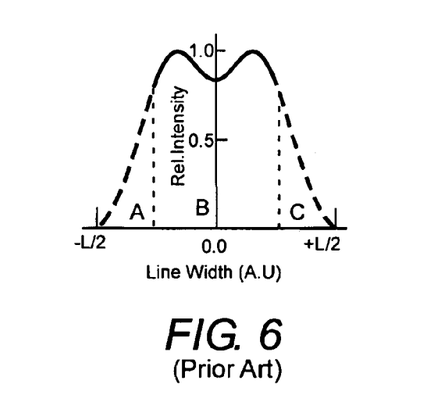
FIG. 6 is a graph schematically illustration the estimated contribution of each of the images of FIG. 3 to the distribution of relative light-intensity as a function of length in the line of light projected by the optical system of FIG. 2

FIG. 4 schematically illustrates the approximate form of intensity of light in the far field of an emitter as a function of divergence angle in a plane W just before a beam from the emitter enters the microlens array fragment of FIG. 3. This is assumed to have the form discussed above with respect to FIG. 1A. The angular distribution of light intensity in bundles 54A, 54B, and 54C is schematically depicted in FIG. 5A, FIG. 5B, and FIG. 5C, respectively, being approximately that of the portion of the input beam passing through the corresponding microlens pairs. Because the system is not telecentric, elongated versions of the intermediate images will not overlap in line 44 but will appear in series along the line. Accordingly, when the angular distributions of FIGS. 5A-C are transformed into physical space along the line 44, the light distribution from the emitter of FIG. 3 along line 44 will have approximately the form depicted in FIG. 6.

Now, of course, as there is a mismatch between the number and spacing of emitters and the number and pitch of microlenses in the microlens arrays, not all, if any, groups of microlenses will be symmetrically illuminated. In fact, most will be asymmetrically illuminated. Accordingly, superimposed along the line there will be edge portions A and C and center portions B from all of the emitters, but with different widths and peak intensities depending on losses. Further, some emitters that only illuminate all of two microlenses may contribute only two wide edge portions with no center portion. This seems to provide the homogenizing effect that contributes to a high degree of uniformity of illumination along the line, albeit at the expense of significant light-loss and scatter, for example, up to about 20% loss. Further, regardless of the homogenizing of the general distribution, light closest to the ends of the line 44 will come from light closest to the edges of the far field distribution of the beams from the emitters entering the microlens arrays. Accordingly, the ends of the line will have the same softness, inconsistency, and susceptibility to variation with varying emitter current, as the above-discussed systems of Reznichenko et al. and Anikitchev et al. There is a need for a line-projecting optical system that provides the beam homogenizing achieved by Rekow, but with minimized loss of light, and with minimized sensitivity to variations in intensity distribution and divergence at the edges of beams from the emitters.

SUMMARY OF THE INVENTION

In one aspect, optical apparatus in accordance with the present invention for projecting a line of light comprises a diode-laser bar including a plurality of individual emitters, first and second microlens arrays, a lens, and plurality of optical elements. The emitters of the diode-laser bar have slow-axis parallel to the length of the diode-laser bar and a fast-axis perpendicular to the slow-axis. Light is emitted from each emitter as a diverging beam in a direction generally along a propagation axis perpendicular to the fast and slow-axes. The microlens arrays are spaced apart in the propagation-axis direction, and each thereof includes a plurality of microlenses having positive optical power in the slow-axis and zero optical power in the fast-axis. The microlenses are arranged such that light from the emitters enters the pair of microlens arrays via the first microlens array and leaves via the second microlens array. The diode-laser bar, the microlens arrays, the lens and the optical elements are configured and further arranged such that the microlens arrays form three or more slow-axis intermediate near-field images of each of emitter in a telecentric arrangement with the lens, and such that the lens and the optical elements project overlapping elongated far-field images of the intermediate near-field images to form a line of light of light having a length in the slow-axis direction.

In another aspect of the present invention, the intermediate images are preferably formed in a plane immediately adjacent the second microlens array. Providing that the intermediate images are formed in a plane immediately adjacent the second microlens array minimizes light-loss in the apparatus. Providing the plurality of intermediate near-field images of each emitter in the telecentric arrangement for projection to form the line of light minimizes the sensitivity of the ends of the line of light to variation in slow-axis divergence of the emitters, and to other variables described hereinbelow.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 7A:
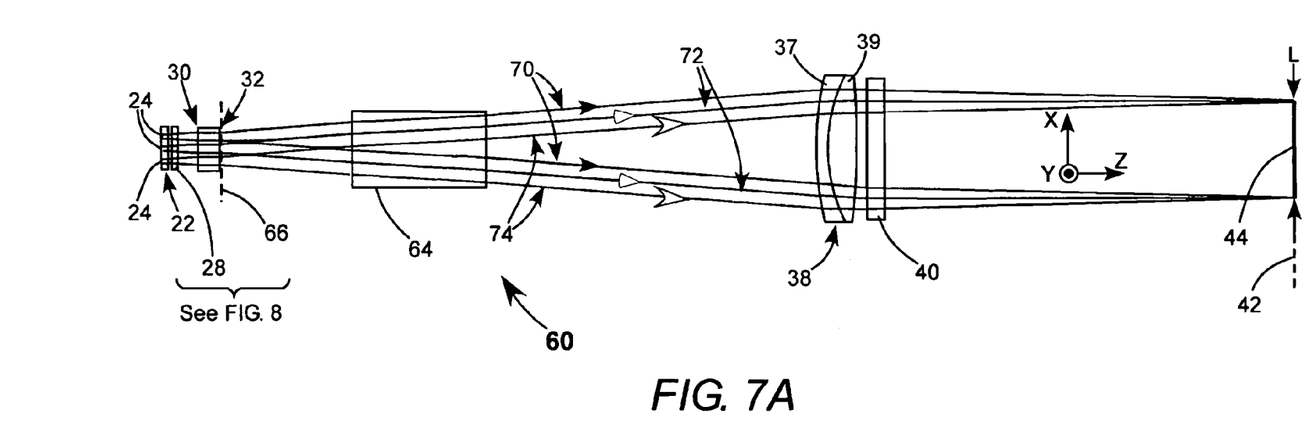
FIGS. 7A and 7B are fast-axis and slow-axis views respectively schematically illustrating an overall layout of a preferred embodiment of an optical system in accordance with the present invention for projecting a line of light, wherein a diode-laser bar has a plurality of emitters, wherein a microlens array forms a plurality of intermediate images of each of the emitters in a telecentric arrangement with a spherical lens that forms overlapping images of each of the intermediate images in a focal plane of the lens to form the line of light, and wherein of the plurality of intermediate images from any one emitter is formed by rays having a different distribution of intensity of light as a function of angle.
Figure 7B:
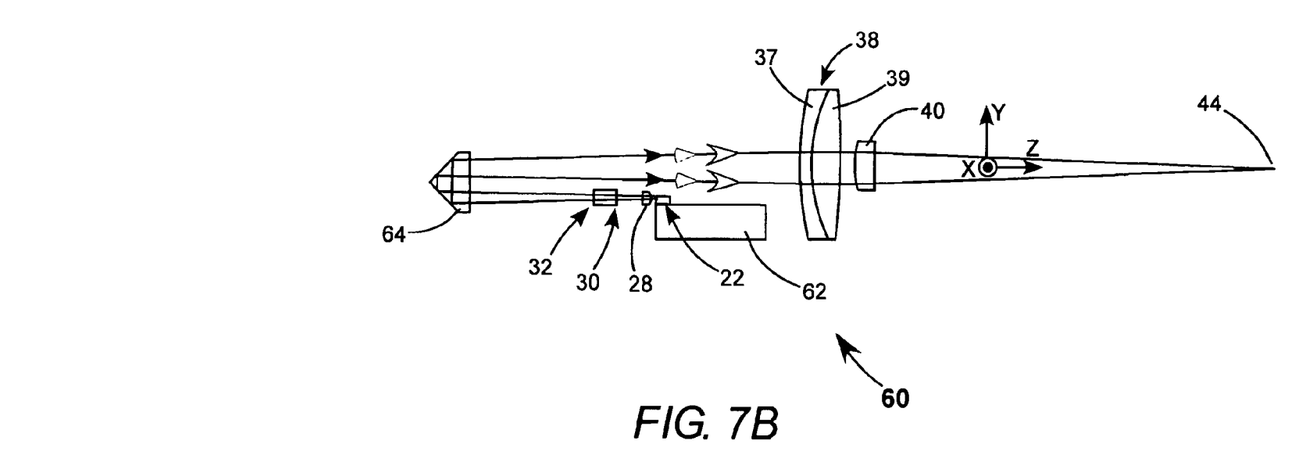
Figure 8:
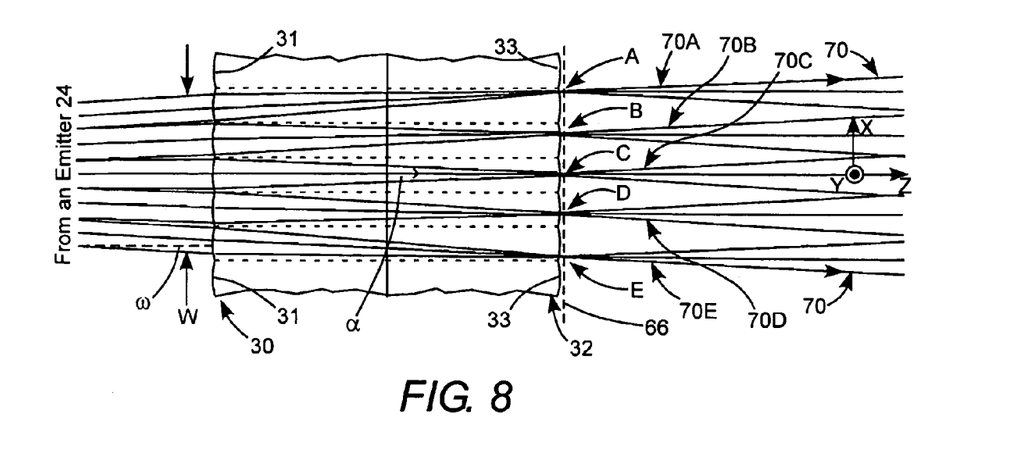
FIG. 8 is a slow-axis view schematically illustrating formation by the microlens array of the optical system of FIGS. 7A-B of five telecentrically-arranged intermediate images of an emitter of the diode-laser bar of the optical system of FIGS. 7A-B.

Referring again to the drawings, wherein like components are designated by like reference numerals, FIG. 7A and FIG. B are slow-axis and fast-axis views, respectively, schematically illustrating one preferred embodiment of an optical system 60 in accordance with the present invention. Detail of FIG. 7A is schematically depicted in FIG. 8. System 60 has a folded optical axis, for reducing the physical length of the system and is depicted as such in FIG. 7B. The system is depicted in an unfolded form in FIG. 7A for convenience of illustration. Turning prism 64 is used to fold the optical axis. Features of system 70 common to features of above discussed prior-art systems are designated by like reference numerals to facilitate comparison of the inventive system with the prior-art systems.

In system 60, a diode-laser bar 22 has a plurality of emitters 24. Only three emitters are depicted for convenience of illustration, although, in practice, there may be 20 or more emitters. Each emitter provides a diverging beam with divergence in the fast-axis greater than divergence in the slow-axis. Rays from each emitter traverse a fast-axis cylindrical lens element 28 (having positive optical power in the fast-axis and zero optical power in the slow-axis) for reducing fast-axis divergence of the beams. The rays are then incident on a microlens array 30 including a plurality of slow-axis cylindrical microlenses 31 (see FIG. 8). The number, and pitch of microlenses 31 in array 30 are selected according to the spacing of the microlenses from the emitters and the slow axis divergence of the beam such that the beam from each emitter is intercepted by at least three adjacent microlenses 31. Preferably at least four microlenses, and, more preferably, at least five microlenses intercept the beam from an emitter. In FIG. 8, five microlenses are depicted as intercepting the beam, with the beam symmetrically illuminating the five microlenses.

Continuing with reference to FIG. 8, the beam from the emitter, on being intercepted by the five microlenses 31, is essentially divided into five portions. Rays in each portion are caused to converge by the microlenses and the converging rays are incident on a corresponding microlens 33 in a microlens array 32. Array 32 has the same number and pitch of microlenses as array 30, and the microlenses in each array have optical axes thereof (not explicitly shown) aligned with each other. Values of the optical spacing of microlenses 31 from the emitter, the radii of curvature of microlenses 31 and 33, and the axial spacing of microlenses 31 and 33, are selected such that each microlens 33 that receives converging rays from a lens 31 forms an intermediate near-field image of the emitter in a plane 66 immediately adjacent, i.e., as close as possible, to microlenses 33. These values are also selected such that diverging ray bundles from each image are parallel to each other. Preferably, the intermediate-image plane 66 should be no further from the output plane of the microlens arrays (here, a plane, not shown, tangent to the apexes of the microlenses) than about 3.5% of the axial distance between the input plane and the output plane of the microlens arrays. This is to maximize the amount of light that leaves a microlens 33 having entered a corresponding microlens 31.

In FIG. 8, five images are designated A, B, C, D, and E, and diverging ray-bundles, propagating parallel to each other, i.e., with chief rays thereof parallel to each other, are designated 70A, 70B, 70C, 70D, and 70E respectively. These bundles propagate parallel to the propagation-axis (Z-axis) and are contained within what might be designated a bundle of ray-bundles designated by bounding rays 70. Each of the bundles of bundles also propagates parallel to the Z-axis.

Referring again to FIG. 7A, each emitter will provide a corresponding bundle of ray-bundles. Three such bundles of bundles 70, 72, and 74, corresponding to three emitters 24 in diode-laser bar are depicted in FIG. 7A. These bundles of ray-bundles are intercepted by spherical lens 38, here, being a cemented doublet lens having a negative meniscus element 37 and a positive, bi-convex element 39. Fast-axis rays from all emitters are focused by a combination of lens element 28, lens 38, and a fast-axis cylindrical lens element 40 in a rear focal plane 42 of lens 38. Lens element 40 has positive optical power in the fast-axis and zero optical power in the slow-axis.

The front focal plane of lens 38 is arranged coplanar with plane 66 in which the intermediate emitter images are formed to form a telecentric arrangement of the lens and the intermediate images. Accordingly, diverging ray bundles from each of the intermediate images are collimated by lens 38 and the resulting collimated ray bundles intersect in plane 42, whereby elongated far-field images of each of the intermediate near-field images overlap in plane 42 to form line of light 44. Ray trace calculations with multiple emitters indicate that distribution light in the overlapping elongated images will be relatively very uniform. A description of one possible mechanism for providing such uniformity is set forth below.

Figure 9:
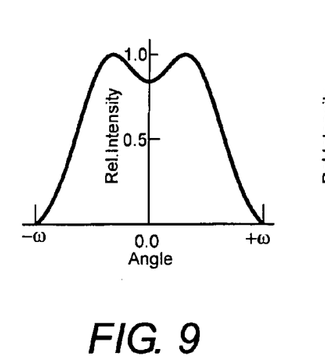
FIG. 9 is a graph schematically illustrating a hypothetical distribution of relative light intensity as a function of divergence angle for light from an emitter of the diode-laser bar on entering the microlens arrays of FIG. 8.
Figure 10:
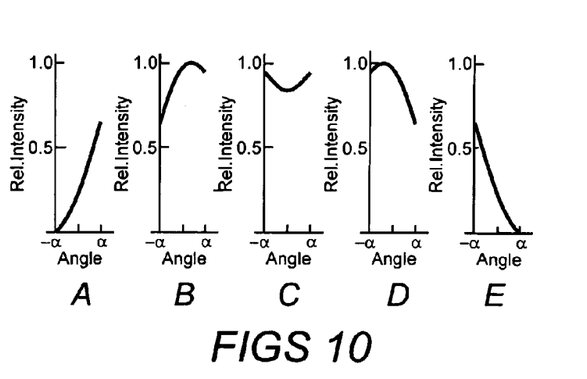
FIGS. 10A-E are graphs schematically illustrating an estimated distribution of relative light intensity as a function of divergence angle in ray bundles forming the intermediate images of FIG. 8.
Figure 11:
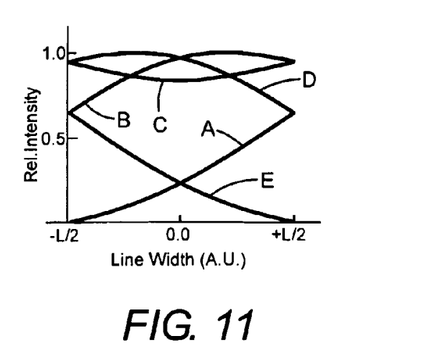
FIG. 11 is a graph schematically illustrating a transformation from angular to physical space of the relative light-distributions of FIGS. 10A-E along the line of light projected by the optical system of FIGS. 7A-B.
Figure 12:
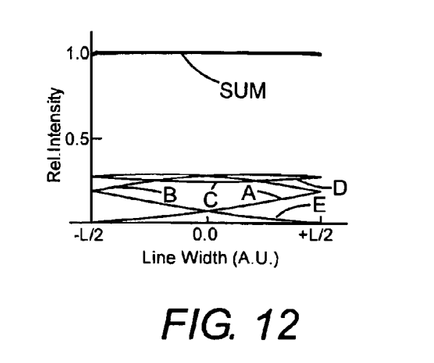
FIG. 12 is a graph schematically illustrating an estimated normalized summation of the relative light-distributions of FIGS. 10A-E along the line of light projected by the optical system of FIGS. 7A-B.

A hypothetical far-field relative distribution of light-intensity as a function of divergence angle of light from an emitter in a width W entering microlens array 30 is schematically depicted in FIG. 9. This is the same hypothetical distribution discussed above with reference to prior-art systems. The angular distribution of light in rays forming images A, B,C, D, and E accordingly will appear, schematically, as depicted in the graphs of FIGS. 10A, 10B, 10C, 10D, and 10E, respectively. These distributions will transform to the spatial distributions of light intensity in the overlapping corresponding far-field images that form line of light 44, as depicted in the graph of FIG. 11 by curves A, B, C, D, and E. This overlap occurs due to the telecentric arrangement of the images with respect to spherical (slow-axis focusing) lens 38. In FIG. 12, these distributions are summed and normalized to indicate that the sum is an essentially flat distribution, here within about 2% of a mean value. Across this sum is a contribution from each part of the original beam from the emitter 24. Accordingly, the projected line can be expected to have well defined ends, and ends that are relatively insensitive to variations in divergence half-angle ω that result from variations in emitter current.

Referring again to FIG. 8, an additional benefit is provided by the fact that ray bundles forming (and leaving) intermediate images A, B, C, D, and E propagate parallel to each other, and by the fact that the images are formed immediately adjacent to the output microlens array 32. This additional benefit is that essentially all rays entering one microlens 31 exit a corresponding microlens 33. This significantly decreases light-loss and light-scattering compared with that of the Rekow system of FIG. 2.

Figure 13:
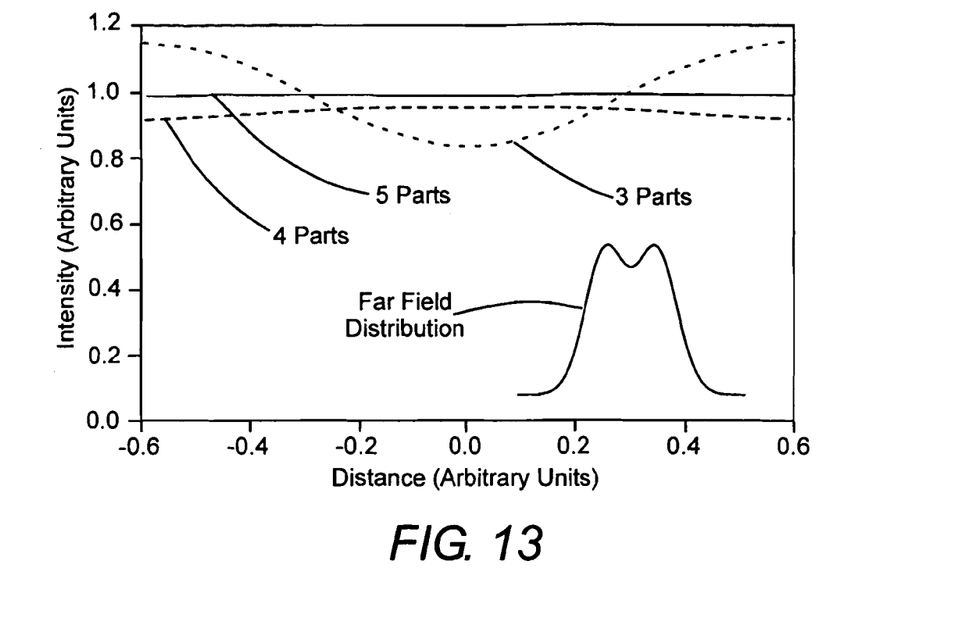
FIG. 13 is a graph schematically illustrating an estimated normalized summation of three, four and five equal parts of the far-field distribution of FIG. 9 transformed into physical space.

As noted above, it is preferred that the beam from any one emitter intercepts at least three microlenses in array 30, i.e., that the array divides the beam from any one emitter into at least three portions. A reason for this can be appreciated by considering curves in the graph of FIG. 13. Here, a dotted curve shows the result of dividing the far-field distribution of FIG. 9, symmetrically, into three equal parts, and summing those three parts. It can be seen here that the resulting sum distribution is actually inferior to the original far field distribution. A considerable improvement is achieved when the distribution of FIG. 9 is divided into four equal parts and summed as indicated in FIG. 13 by the long-dashed curve. A further improvement is achieved when the distribution of FIG. 9 is divided into five equal parts and summed as indicated in FIG. 13 by the solid curve.

Other similar calculations indicate that if four, five, or more microlenses are illuminated, the sum becomes (progressively with the number of microlenses illuminated) relatively insensitive to asymmetry of illumination, and relatively insensitive to differences in far-field intensity distribution from emitters. There is also reason to expect that, provided the telecentric arrangement of the multiple intermediate images and lens 38 is maintained, and provided the intermediate images are immediately adjacent to the microlens arrays, there will be some actual benefit to uniformity if there is not a one-to-one (or not some other integer ratio) correspondence between the number of microlenses in a array and the number of emitters.

Figure 14:
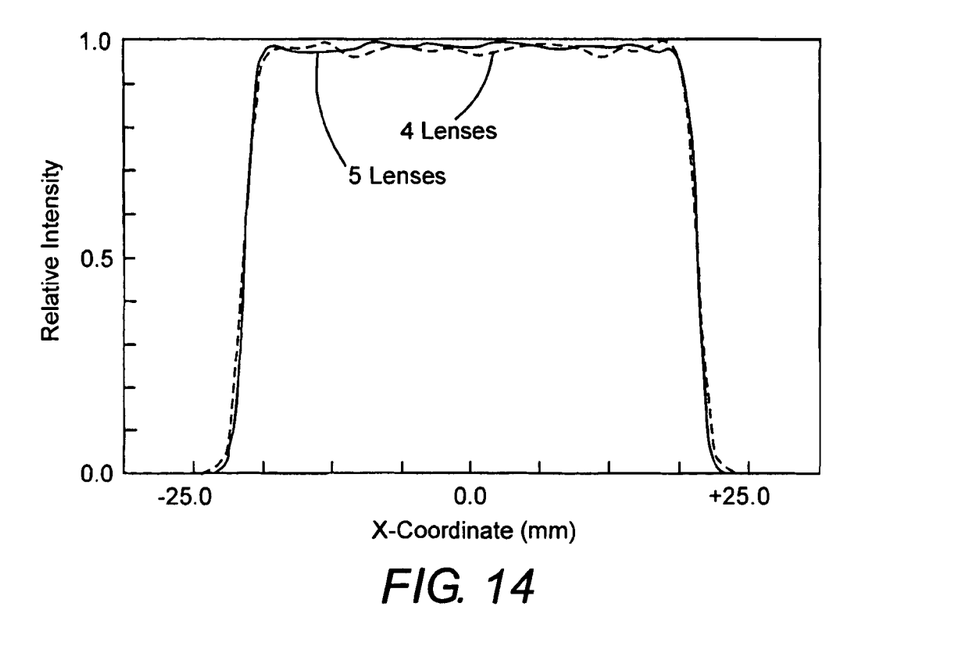
FIG. 14 is a graph schematically illustrating a ray-trace-software-computed intensity as a function of distance along a projected line of light for one example of a system in accordance with the system of FIGS. 7A-B & 8 wherein four microlenses per emitter are illuminated and for another example wherein five microlenses per emitter are illuminated.

FIG. 14 is a graph schematically depicting a ray-trace-software (ZEMAX®) computed intensity as a function of distance (X-axis coordinate) along a projected line of light for an example of the inventive optical system wherein five microlenses (solid curve) and four microlenses (dashed curve) are illuminated by each emitter. It can be seen that illuminating five lenses rather than four lenses provides a slightly more uniform illumination with a slightly improved end definition (steepness of the transition from zero to uniform intensity and vice-versa). The difference in uniformity corresponds to about that difference predicted by the simple, "one-emitter" estimate of FIG. 13.

The following assumptions are made for ray tracing in the five-microlens case of FIG. 14. Diode-laser bar 22 includes 40 emitters having an aperture width of 150 µm and a spacing of 250 µm (center-to-center). Microlens arrays 30 and 32 each include 40 microlenses having a pitch of 250 µm. It is assumed that the emitters and microlenses are exactly aligned. Microlenses 31 are axially spaced by 8.1 mm from the plane (emitting-apertures) of the emitters. Microlenses 31 have a radius of curvature of 0.5 mm and microlenses 33 have a radius of curvature of 0.56 mm. The microlens arrays are arranged as depicted in FIG. 8 with the space between the refracting surfaces of each array filled with a solid medium, here assumed to fused silica have a refractive index of 1.458. The axial, (vertex-to-vertex) spacing between microlenses 31 and microlenses 33 is assumed to be 1.8 mm. The near field of each emitter is assumed to be uniform at the exit plane, i.e., the plane of the emitter apertures of the diode-laser bar. For calculation of the four-microlens case, a spacing between the emitter apertures and microlens array 30 of 6.5 mm is assumed, with all other parameters being the same as discussed above with reference to the five-microlens case.

Figure 15:
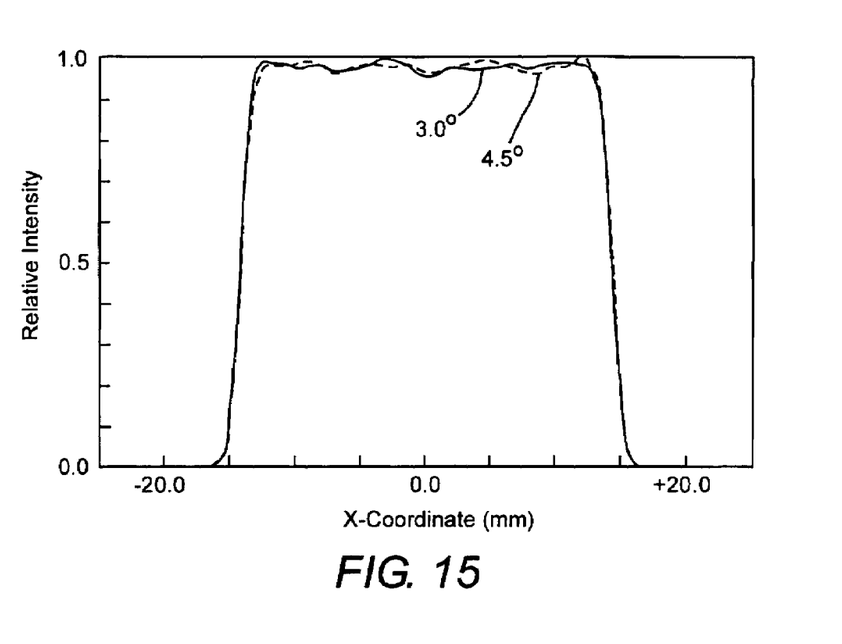
FIG. 15 is a graph schematically illustrating a ray-trace-software-computed intensity as a function of distance along a projected line of light for one example of a system in accordance with the system of FIGS. 7A-B & 8, wherein five microlenses per emitter are illuminated and wherein each emitter emits a beam have a divergence 3°, and for another example wherein each emitter emits a beam have a divergence 4.5°.

FIG. 15 is a graph schematically depicting a ray-trace-software computed intensity as a function of distance (X-axis coordinate) along a projected line of light for an example of the inventive optical system wherein five microlenses are illuminated by each emitter and the intensity is computed for a 1/e² divergence half-angle of 3° (solid curve) and 4.5° (dashed curve). Parameters for the microlens arrays are assumed to be those discussed above with reference to the five-microlens case of FIG. 14. It can be seen from FIG. 15 that there is no significant difference in uniformity along the line as a result of the change in divergence, and, in particular, that there is no difference in length of the line or definition of the ends of the line.

Figure 16:
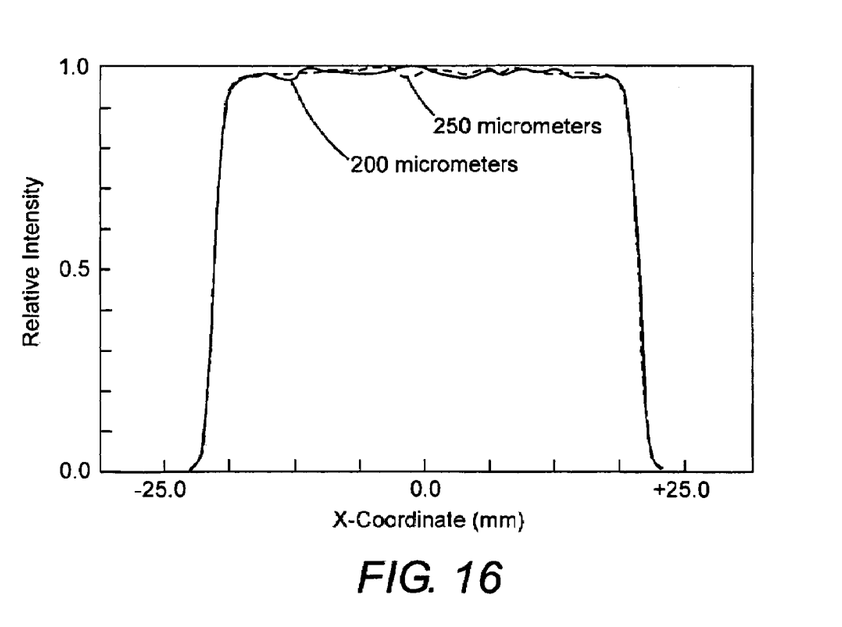
FIG. 16 is a graph schematically illustrating a ray-trace-software-computed intensity as a function of distance along a projected line for one example of a system in accordance with the system of FIGS. 7A-B & 8 wherein microlenses in the microlens arrays have a pitch of 250 micrometers and the emitter spacing is 250 micrometers, and for another example wherein microlenses in the microlens arrays have a pitch of 250 micrometers and the emitter spacing is 200 micrometers.

FIG. 16 is a graph schematically depicting a ray-trace-software computed intensity as a function of distance (X-axis coordinate) along a projected line of light for an example of the inventive optical system wherein five microlenses are illuminated by each emitter. The dashed curve is computed for a case wherein the pitch of the microlenses is 250 μm, and emitters and microlenses are equal in number and perfectly aligned, as discussed above with reference to the examples of FIG. 14. The solid curve is and for a case wherein the emitter spacing in the diode-laser bar is changed to 200 μm, such that the number of emitters and microlenses is no longer equal, and such that there is some degree of misalignment between most of the emitters and the microlenses. It can be seen that there is a slight reduction in uniformity along the line resulting from the inequality and misalignment but that there is no difference in length of the line or definition of the ends of the line.

In the above-presented description of the inventive optical system, corresponding microlenses 31 and 33 of arrays 30 and 32, in the preferred arrangement thereof, are, in effect, convex cylindrical refractive surfaces axially spaced by a solid medium, i.e., the microlens arrays are formed into a single monolithic unit. Other arrangements of microlens arrays that may be useful in the inventive optical system are depicted in FIG. 17A, FIG. 17B, and FIG. 17C.

Figure 17A:
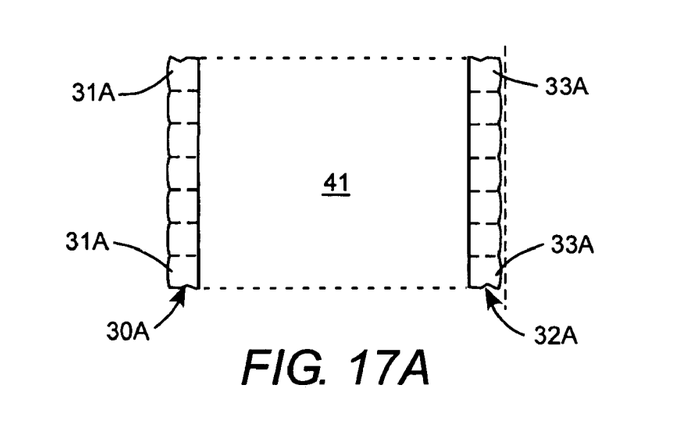
FIGS. 17A-C schematically illustrate examples of microlens arrays that may be substituted for the microlens arrays of FIG. 8 in apparatus in accordance with the present invention.

FIG. 17A schematically illustrates microlens arrays 30A and 32A arranged as separate units with an air space or a gap 41 therebetween. Here microlenses 31A of array 30A are and convex-plano lenses, and microlenses 33A of array 32B are plano-convex lenses. FIG. 17B schematically illustrates microlens arrays 30B and 32B also arranged as separate units with an air space or a gap 41 therebetween. Here microlenses 31B of array 30B and microlenses 33B of array 32B are plano-convex lenses. FIG. 17C schematically illustrates microlens arrays 30C and 32C still arranged as separate units with an air space or a gap 41 therebetween. In this case, microlenses 31C of array 30C are plano-convex lenses and microlenses 33B of array 32B are convex-plano lenses. It should be noted that in the case of the spaced apart microlens arrays of 17C plane 66 in which intermediate emitter images are formed by the array could actually be described as being within microlens array 32C. This is because this plane is preferably located as close as possible to the last microlens surface having finite optical power.

Figure 17B:
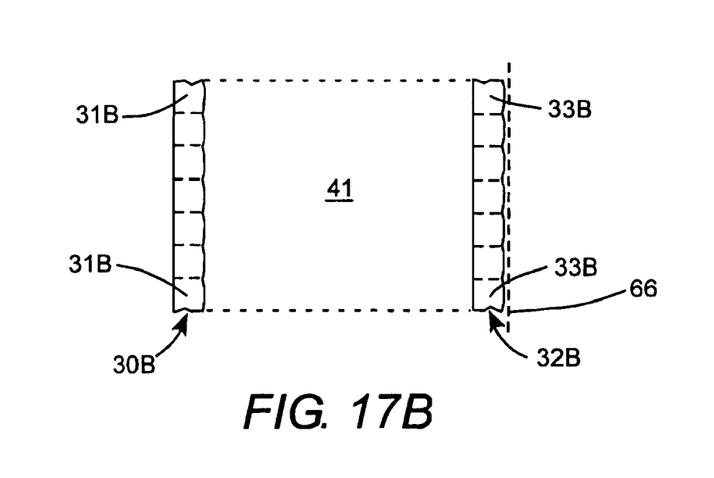
Figure 17C:
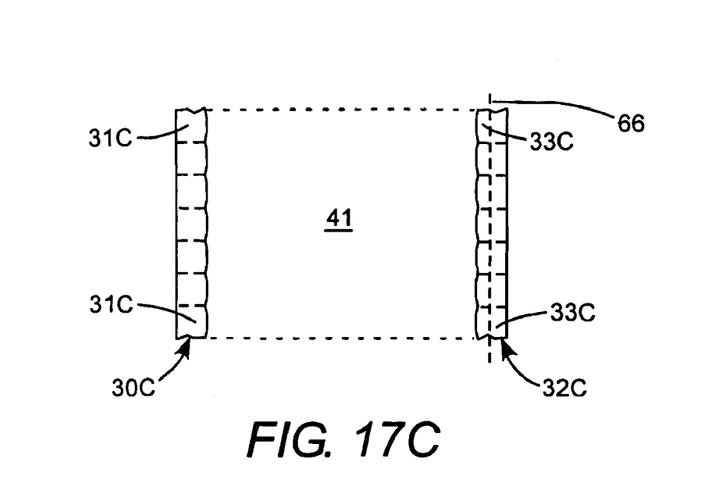

It should also be noted that the microlens array arrangements of FIGS. 17A-C are just three examples of possible arrangements. Other air-spaced arrangements are possible in which one or both of the arrays are bi-convex lenses or meniscus lenses. Whatever the arrangement, microlenses in each array must have positive optical power; corresponding microlenses in each array must be substantially axially aligned; and the arrays must be arranged with respect to emitters of the diode-laser bar such that at least three microlenses are illuminated in the slow-axis by any one emitter. The arrays must be arranged such that chief rays of the ray bundles forming the plurality of images from each emitter (and correspondingly ray bundles leaving the intermediate images) are substantially parallel to each other. The plane in which images are formed should correspond with the optical position of the front focal plane of the spherical lens, which is used, together with fast-axis cylindrical lenses to form overlapping far-field images of the intermediate near filed images. Preferably, the plane 66 in which the intermediate near-field images are formed should be immediately adjacent the last microlens surfaces having finite (non-zero) slow-axis optical power.

In summary, the present invention is described above in terms of a preferred and other embodiments. The invention is not limited, however, to the embodiments described and depicted. Rather, the invention is limited only by the claims appended hereto.

What is claimed is:

1. Optical apparatus, comprising:
    a diode-laser bar including a plurality of emitters, each of said emitters having a slow-axis parallel to the length of said diode-laser bar and a fast-axis perpendicular to the slow-axis, with light emitted from said emitters as a beam having rays diverging in the fast and slow-axes and propagating generally along an axis perpendicular to the fast and slow-axes, and with said emitters being spaced apart in the slow-axis direction;
    a lens and a plurality of optical elements, said lens having positive optical power in at least the slow-axis;
    first and second arrays of cylindrical microlenses spaced apart from each other in the propagation-axis direction and spaced apart in the propagation axis direction from the diode-laser bar, said first and second arrays being numbered sequentially in the direction of propagation, with microlenses in each of said arrays being parallel to each other and having optical power in the slow-axis only, and with microlenses in said first array being axially aligned with corresponding microlenses in said second array;
    the number of microlenses in said arrays and the spacing of said first microlens array from said diode-laser bar coupled with the slow-axis divergence of the light as the light reaches the first array of microlenses being selected such that each emitter illuminates at least three of the microlenses of said first array but substantially less than all the microlenses in the first array and the spacing and radius of curvature of the microlenses in each array being selected such that said arrays form a plurality of intermediate slow-axis near-field images of each emitter spaced apart in the slow-axis direction in a plane perpendicular to the propagation-axis, with bundles of diverging slow-axis rays leaving said intermediate images propagating generally parallel to the propagation axis, and;
    said lens being arranged with a front focal-plane thereof about coplanar with said intermediate-image plane and said lens and said optical elements arranged to project overlapping elongated far-field images of each of said intermediate near-field images to form a line of light in about a rear focal plane of said lens, said line of light having a length in the slow-axis direction.

2. The apparatus of claim 1, wherein said microlens arrays are in the form of a solid monolithic unit with a convex cylindrical surface forming each microlens.

3. The apparatus of claim 2, wherein said intermediate image plane is immediately adjacent said second microlens array.

4. The apparatus of claim 1, wherein said lens is a spherical lens having equal optical power in both axes and said optical elements are cylindrical optical elements having optical power in the fast-axis only.

5. The apparatus of claim 4, wherein said optical elements and said lens focus fast axis rays from said emitters in said rear focal plane.

6. The apparatus of claim 5, wherein one of said optical elements is located between said diode-laser bar and said first microlens array and arranged to reduce the fast-axis divergence of light from said emitters.

7. The apparatus of claim 4, wherein said spherical lens collimates rays from said diverging bundles thereof from said intermediate images, and collimated rays from each bundle intersect in about said rear focal plane of said lens.

8. The apparatus of claim 1, wherein the number of said intermediate near-field images of each emitter is equal to the number of microlenses in said first array that are illuminated by each emitter.

9. The apparatus of claim 1, wherein the spacing of said emitters in said diode-laser bar and the pitch of microlenses in said arrays is equal.

10. The apparatus of claim 9, wherein each of said microlenses is aligned with a said emitter in the propagation-axis direction.

11. The apparatus of claim 1, wherein said lens includes a plurality of optical elements.

12. The apparatus of claim 11, wherein said lens is a cemented doublet having first and second lens elements.

13. The apparatus of claim 12, wherein said first lens element is a positive meniscus element and said second element is a negative meniscus element and said second lens element is a bi-convex element.

14. The apparatus of claim 1, wherein each of said emitters illuminates at least four of the microlenses of said first array.

15. The apparatus of claim 14, wherein each of said emitters illuminates at least five of the microlenses of said first array.

16. Optical apparatus, comprising:
a diode-laser bar including a plurality of emitters, each of said emitters having a slow-axis parallel to the length of said diode-laser bar and a fast-axis perpendicular to the slow-axis, with light emitted from said emitters as a beam having rays diverging in the fast and slow-axes and propagating generally along an axis perpendicular to the fast and slow-axes, and with said emitters being spaced apart in the slow-axis direction;
a lens and a plurality of optical elements, said lens having positive optical power in at least the slow-axis;
first and second arrays of cylindrical microlenses spaced apart from each other in the propagation-axis direction and spaced apart in the propagation-axis direction from the diode-laser bar, said first and second arrays being numbered sequentially in the direction of propagation, with microlenses in each of said arrays being parallel to each other and having optical power in the slow-axis only, and with microlenses in said first array being axially aligned with corresponding microlenses in said second array;
the number of microlenses in said arrays and the spacing of said first microlens array from said diode-laser bar coupled with the slow-axis divergence of the light as the light reaches the first array of microlenses being selected such that each emitter illuminates at least three of the microlenses of said first array but substantially less than all the microlenses in the first array; and the spacing and radius of curvature of the microlenses in each array being selected such that said arrays from a plurality of intermediate slow-axis near-field images of each emitter spaced apart in the slow axis direction in a plane perpendicular to the propagation-axis with bundles of diverging slow-axis rays leaving said intermediate images propagating generally parallel to the propagation axis, and;
said lens being arranged with a front focal-plane about coplanar with said intermediate image plane and said lens and said optical elements arranged so that said slow-axis diverging rays in each of said bundles thereof from said intermediate images are collimated, said collimated rays from each of said bundles intersect in a rear focal plane of said lens and light from said emitters is focused in the fast-axis in said rear focal plane of said lens.

17. The apparatus of claim 16, wherein said microlens arrays are in the form of a solid monolithic unit with a convex cylindrical surface forming each microlens.

18. The apparatus of claim 17, wherein said intermediate-image plane is immediately adjacent said second microlens array.

19. The apparatus of claim 16, wherein the number of said intermediate near-field images of each emitter is equal to the number of microlenses in said first array that are illuminated by each emitter.

20. The apparatus of claim 16, wherein the spacing of said emitters in said diode-laser bar and the pitch of microlenses in said arrays is equal.

21. The apparatus of claim 20, wherein each of said microlenses is aligned with a said emitter in the propagation-axis direction.

22. Optical apparatus, comprising:
a diode-laser bar including a plurality of emitters, each of said emitters having a slow-axis parallel to the length of said diode-laser bar and a fast-axis perpendicular to the slow-axis, with light emitted from said emitters as a beam having rays diverging in the fast and slow-axes and propagating generally along an axis perpendicular to the fast and slow axes, and with said emitters being spaced apart in the slow-axis direction;
a lens and a plurality of optical elements, said lens having positive optical power in at least the slow-axis;
first and second arrays of cylindrical microlenses spaced apart from each other in the propagation-axis direction and spaced apart in the propagation axis direction from the diode-laser bar, said first and second arrays being numbered sequentially in the direction of propagation, with micro lenses in each of said arrays being parallel to each other and having optical power in the slow-axis only, and with microlenses in the said array being axially aligned with corresponding microlenses in said second array;
the number of microlenses in said arrays and the spacing of said first microlens array from said diode-laser bar coupled with the slow-axis divergence of the light as the light reaches the first array of microlenses being selected such that each emitter illuminates at least three of the microlenses of said first array but substantially less than all the microlenses in the first array and the spacing and radius of curvature of the microlenses in each array being selected such that said arrays from a plurality of intermediate slow-axis near-field images of each emitter spaced apart in the slow-axis direction in a plane perpendicular to the propagation-axis and adjacent said second microlens array, with bundles of diverging slow-axis rays leaving said intermediate images propagating generally parallel to the propagation-axis, and;

said lens being arranged with a front focal-plane about coplanar with said intermediate image plane and said lens and said optical elements arranged to project overlapping elongated far-field images of each of said intermediate near-field images to form a line of light in about a rear focal plane of the said lens, said line of light having a length in the slow-axis direction.

23. The apparatus of claim 22, wherein said intermediate image plane is spaced from said second microlens array by no more than about 3.5% of the spacing between said first and second microlens arrays.

24. The apparatus of claim 23, wherein said microlens arrays are in the form of a solid monolithic unit with a convex cylindrical surface forming each microlens.

25. The apparatus of claim 24, wherein said intermediate-image plane is immediately adjacent said second microlens array.

26. Optical apparatus, comprising;
a diode-laser bar including a plurality of individual emitters, first and second microlens arrays as a group, a lens and plurality of optical elements, said emitters of said diode-laser bar having slow-axis parallel to the length of said diode-laser bar and a fast-axis perpendicular to the slow-axis with light being emitted as a diverging beam in a direction generally along a propagation axis perpendicular to said fast and slow-axes;
said microlens arrays being spaced apart in the propagation axis direction and each thereof including a plurality of microlenses having positive optical power in the slow-axis and zero optical power in the fast-axis and arranged such that light from the emitters of said diode-laser bar enters said microlens arrays group via said first microlens array and leaves said array group via said second microlens array; and
wherein said diode-laser bar, said microlens arrays, said lens and said optical elements are further configured and arranged along with the slow-axis divergence of the light as the light reaches the first array of microlenses such that each emitter illuminates at least three of the microlenses of said first array but substantially less than all the microlenses in the first array and such that said microlens arrays form at least three slow-axis intermediate near-field images of each of said plurality of emitters in a telecentric arrangement with said lens, and such that the lens and the optical elements project overlapping elongated far-field images of the intermediate near-field images to form a line of light of light having a length in the slow-axis direction.

27. The apparatus of claim 26, wherein said intermediate images are formed in a plane immediately adjacent said second microlens array.

28. The apparatus of claim 27, wherein said microlens arrays group is in the form of a solid monolithic unit with a convex cylindrical surface forming each microlens.

29. The apparatus of claim 26, wherein said microlens arrays form at least four slow-axis intermediate near-field images of each of said plurality of emitters.

* * * * *